(12) United States Patent
Henrickson et al.

(10) Patent No.: US 7,503,042 B2
(45) Date of Patent: Mar. 10, 2009

(54) NON-SCRIPT BASED INTELLIGENT MIGRATION TOOL CAPABLE OF MIGRATING SOFTWARE SELECTED BY A USER, INCLUDING SOFTWARE FOR WHICH SAID MIGRATION TOOL HAS HAD NO PREVIOUS KNOWLEDGE OR ENCOUNTERS

(75) Inventors: David L. Henrickson, Miami, FL (US); Michael F. Kenny, Fort Lauderdale, FL (US)

(73) Assignee: Microsoft Corporation, Redmond, WA (US)

( * ) Notice: Subject to any disclaimer, the term of this patent is extended or adjusted under 35 U.S.C. 154(b) by 622 days.

(21) Appl. No.: 10/094,251

(22) Filed: Mar. 8, 2002

(65) Prior Publication Data

US 2003/0172373 A1    Sep. 11, 2003

(51) Int. Cl.
 G06F 9/445    (2006.01)
(52) U.S. Cl. .................... 717/175; 717/121; 717/174; 707/204
(58) Field of Classification Search ......... 717/168–178, 717/100
 See application file for complete search history.

(56) References Cited

U.S. PATENT DOCUMENTS

| | | | |
|---|---|---|---|
| 4,958,270 A | 9/1990 | McLaughlin et al. | |
| 5,555,416 A * | 9/1996 | Owens et al. | 717/178 |
| 5,758,150 A | 5/1998 | Bell et al. | |
| 5,819,020 A | 10/1998 | Beeler, Jr. | |
| 5,870,611 A * | 2/1999 | London Shrader et al. | 717/175 |
| 5,915,252 A | 6/1999 | Misheski et al. | |
| 6,029,232 A | 2/2000 | Honda | |
| 6,192,518 B1 * | 2/2001 | Neal | 717/175 |
| 6,202,073 B1 | 3/2001 | Takahashi | |
| 6,219,669 B1 | 4/2001 | Haff et al. | |
| 6,324,690 B1 | 11/2001 | Luu | |
| 6,449,733 B1 | 9/2002 | Bartlett et al. | |
| 6,535,915 B1 | 3/2003 | Valys et al. | |
| 6,598,223 B1 | 7/2003 | Vrhel et al. | |
| 6,611,923 B1 | 8/2003 | Mutalik et al. | |
| 6,625,622 B1 | 9/2003 | Henrickson et al. | |
| 6,671,705 B1 | 12/2003 | Duprey et al. | |
| 6,728,877 B2 | 4/2004 | Mackin et al. | |
| 6,760,708 B1 | 7/2004 | Hubbard et al. | |

(Continued)

FOREIGN PATENT DOCUMENTS

WO        0153938 A        7/2001

OTHER PUBLICATIONS

"Migrating Files and Settings", Jun. 1, 2001 (8 pages). Online retrieved at <http://technet.microsoft.com/en-us/library/bb457074.aspx>.*

(Continued)

*Primary Examiner*—Tuan Q. Dam
*Assistant Examiner*—Thuy Dao

(57) ABSTRACT

A computer migration method for transferring non-physical aspects from a source computer to a target computer according to an embodiment. In one embodiment, the method includes surveying the source computer aspects, and without scripts, associating portions of the source computer aspects into source computer Application Groups on the fly. The method also includes generating a list at least including the source computer Application Groups; receiving a user's selection of source computer Application Groups to be migrated to the target computer; and transferring selected source computer Application Groups to the target computer,; wherein the target computer is adapted to supplant the source computer after migration.

14 Claims, 3 Drawing Sheets

Figure 1A:
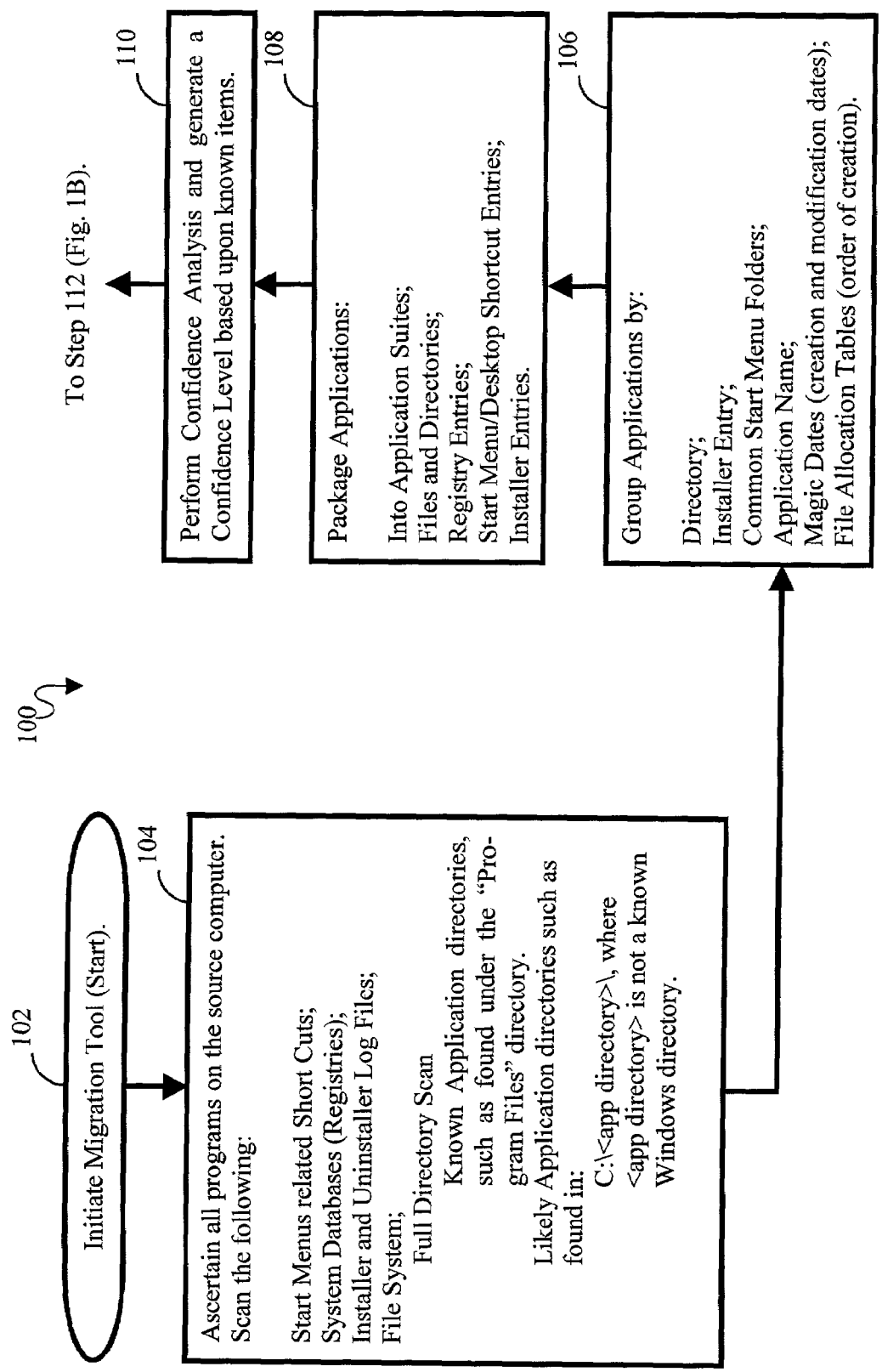

| Confidence | Application | Destination Directory |
|---|---|---|
| ☑ 100% | Microsoft Visual Studio 6.0 Enterprise Edition | D:\Microsoft Visual Studio\ |
| ☑ 80% | Adobe Acrobat Reader | C:\Program Files\Adobe |
| ☐ 0% | BootMagic Configuration | |
| ☐ 0% | Presario Screen Saver | |
| ☐ 0% | Intel SpeedStep Technology Applet | |

U.S. PATENT DOCUMENTS

| | | | |
|---|---|---|---|
| 6,853,978 B2 | 2/2005 | Forth et al. | |
| 6,865,655 B1 | 3/2005 | Andersen | |
| 6,912,384 B2 | 6/2005 | Huomo et al. | |
| 6,928,644 B1 | 8/2005 | Kroening et al. | |
| 6,938,058 B2 | 8/2005 | Henrickson et al. | |
| 6,944,790 B2 | 9/2005 | Hamilton et al. | |
| 6,963,908 B1 * | 11/2005 | Lynch et al. | 709/220 |
| 7,024,528 B2 | 4/2006 | LeCrone et al. | |
| 7,062,645 B2 | 6/2006 | Kroening | |
| 7,069,402 B2 | 6/2006 | Coulter et al. | |
| 7,082,553 B1 | 7/2006 | Wang | |
| 7,210,131 B2 | 4/2007 | Schmidt et al. | |
| 2001/0034728 A1 | 10/2001 | McBride et al. | |
| 2001/0056438 A1 | 12/2001 | Ito | |
| 2002/0010808 A1 * | 1/2002 | Wiggins et al. | 709/328 |
| 2002/0083366 A1 | 6/2002 | Ohran | |
| 2002/0087588 A1 | 7/2002 | McBride et al. | |
| 2002/0103779 A1 | 8/2002 | Ricart et al. | |
| 2002/0104080 A1 * | 8/2002 | Woodard et al. | 717/176 |
| 2002/0160760 A1 | 10/2002 | Aoyama | |
| 2003/0009754 A1 * | 1/2003 | Rowley et al. | 717/177 |
| 2003/0037327 A1 * | 2/2003 | Cicciarelli et al. | 717/178 |
| 2003/0037328 A1 * | 2/2003 | Cicciarelli et al. | 717/178 |
| 2003/0074386 A1 | 4/2003 | Schmidt et al. | |
| 2003/0105912 A1 | 6/2003 | Noren | |
| 2003/0134625 A1 | 7/2003 | Choi | |
| 2003/0172373 A1 | 9/2003 | Henrickson et al. | |
| 2003/0200542 A1 | 10/2003 | Shaughnessy et al. | |
| 2004/0025155 A1 | 2/2004 | Sedlack et al. | |
| 2004/0103064 A1 | 5/2004 | Howard et al. | |
| 2004/0128203 A1 * | 7/2004 | Pierre et al. | 705/26 |
| 2004/0139128 A1 | 7/2004 | Becker et al. | |
| 2004/0142684 A1 | 7/2004 | Ratert et al. | |
| 2004/0158766 A1 | 8/2004 | Liccione et al. | |
| 2004/0163008 A1 | 8/2004 | Kim | |
| 2004/0199812 A1 | 10/2004 | Earl et al. | |
| 2004/0235523 A1 | 11/2004 | Schrire et al. | |
| 2004/0237079 A1 | 11/2004 | Cox et al. | |
| 2005/0044232 A1 | 2/2005 | Keane | |
| 2005/0191998 A1 | 9/2005 | Onyon et al. | |
| 2005/0246575 A1 | 11/2005 | Chen et al. | |
| 2006/0010436 A1 | 1/2006 | Henrickson et al. | |
| 2006/0036658 A1 | 2/2006 | Henrickson | |
| 2006/0036890 A1 | 2/2006 | Henrickson | |
| 2006/0036895 A1 | 2/2006 | Henrickson | |
| 2006/0183469 A1 | 8/2006 | Gadson | |
| 2007/0067766 A1 | 3/2007 | Tal et al. | |

OTHER PUBLICATIONS

"User State Migration in Windows XP", Jun. 1, 2001 (8 pages). Online retrieved at <http://technet.microsoft.com/en-us/library/bb457090.aspx>.*

Internet website titled "Fusion-one-Mobile & Data Synchronization Solutions" with the World Wide Web address of: http://www.fusionone.com.

ANON., "M-Commerce Initiative Launched by InstantService.com and MobileUSA.com; Live interaction for E-commerce Sales and Service Anywhere," Business Wire, Jul. 19,2000.

Deignam, M.P., "Transfer Personal Settings Between Computers," WinMag.com, Nov. 29,2000.

ANON., "Miramar Systems' Desktop DNA Utility Chosen by MCI WorldCom for Hardware Refresh Program," Business Wire, p. 0090, Oct. 12,2000.

ANON., "Picture Taker Enterprise Edition Version 3.0 Enable for Windows 2000," Business Wire, Feb. 17, 2000.

ANON., "Tranxition Corporation Announces Availability of Personality Transport Professional," Business Wire, Apr. 3, 2000.

O'Brien, J., "Aveo Knows What Your PC is Doing; Finds Software Conflicts," Financial Post, p. 8, Jul. 29, 2000.

Raskin, R. "Easy Connections from Old to New Software Helps Transfer Data, Programs from PC to PC," Arizona Republic, final chaser edition, business section, p. D3, Sep. 25, 2001.

Fried, J.J., "Program not as Simple as it Sounds: Alohabob is Supposed to Easily Transfer Data Between Computers, but the Process Isn't Always Quick or Easy," Philadelphia Inquirer, City-D edition, TechLife section, p. C07, Jul. 18, 2002.

* cited by examiner

NON-SCRIPT BASED INTELLIGENT MIGRATION TOOL CAPABLE OF MIGRATING SOFTWARE SELECTED BY A USER, INCLUDING SOFTWARE FOR WHICH SAID MIGRATION TOOL HAS HAD NO PREVIOUS KNOWLEDGE OR ENCOUNTERS

BACKGROUND OF THE INVENTION

1. Field of the Invention

The present invention broadly relates to computer system migration tools, and the improvements thereof.

2. Background

Computer migration may be broadly defined as the process of transferring some or all of a "source" computer's information, non-device assets or intellectual property, to a "target" computer. The computer migration process is often carried out via a special computer migration tool kit in the form of software loaded on the source computer, the target computer, or both. The two computers involved in the migration process can be linked in a variety of ways, including, inter alia, direct cables/wires, direct telephone links, Local Area Networks (LANs), and Wide Area Networks (WANs). Alternatively, another approach is to use an intermediate storage device or system (e.g., rewritable or write-once CDs, ZIP® storage devices, network storage, etc.) to which to transfer aspects of the source computer. The aspects to be migrated are then transferred from the intermediate device to the target computer.

With rapid advancements in the computing power and memory capacity of widely available desktop computers, as well as others, the practical life cycle of computer systems continues to decrease. While users continue to switch to newer computer systems, there is very often a need and desire to transfer important aspects of the old computer system to the new computer system. There are several prior art approaches to computer migration, each having drawbacks. A "brute-force" approach entails painstakingly transferring software, data and other aspects of a source computer to a target computer in a piece-meal fashion. This method is tedious, extremely slow, and often requires a level of sophistication not possessed by ordinary computer users who wish to transfer important aspects from one computer to another computer.

An improved approach is to semi-automatically migrate aspects of a source computer to a target computer using a migration tool kit which has been loaded in the source computer, the target computer, or both. Using this approach, all non-physical aspects of source computer are transferred en masse. While this eliminates some of the drawbacks (i.e., tediousness, time consuming, difficult for ordinary users) of brute-force migration methods, there are yet problems with this approach. Often the user would like to transfer most of the aspects of the source computer, but not all of them—especially where newer versions of software and operating system are available. This approach can also transfer aspects from the source computer that may be incompatible with the target computer, leading to conflicts, dangerous system instability, and sometimes inoperability of the target computer.

Later generation software such as the Alohabob's™ PC Relocator software marketed by Eisenworld, Inc., the assignee of this Letters Patent, solves the aforementioned problems by transferring all of the important aspects of the source computer—including preferences and settings—to the target computer, while giving the user the option to leave behind potentially troublesome (to the target computer) aspects of the source computer.

Even with these improvements, the en masse transfer from the source computer to the target computer is not always desirable. Users sometimes wish to be given the choice of only transferring specific programs and related data. The typical prior art approach to transferring specific programs is a script-based approach, in which the migration tool responds directly to scripts stored in the migration software for the exact course of action to take regarding known software programs. This approach only works where the migration tool kit is set up to migrate the specific program in question. Thus, it may be possible to successfully migrate very popular software programs and data, but not less popular or more proprietary software programs and data. These tools have no mechanism to migrate aspects for which there are not already stored scripts.

A last ditch effort of the prior art approaches allows sophisticated users who are so inclined to develop their own scripts for programs that are not recognized by the original migration software. However, even if one is capable and motivated to generate scripts for programs not covered by the original migration software, there is no flexibility to handle new software on the fly.

What is therefore sorely needed is a migration tool which allows a user to conveniently transfer specific aspects of a source computer to a target computer that the user selects, and a migration tool that can intelligently and automatically transfer aspects of the source computer to the target computer, even when the migration tool has no previous knowledge of, or encounters with a particular program to be transferred.

SUMMARY OF THE INVENTION

In view of the aforementioned problems and deficiencies of the prior art, the present invention provides a computer migration method for transferring software programs from a source computer to a target computer. The method at least includes the steps of surveying the source computer assets, without scripts, associating portions of the source computer assets into source computer Application Groups on the fly, and generating a list at least including the source computer Application Groups. The method also at least includes the steps of receiving a user's selection of source computer Application Groups to be migrated to the target computer, and transferring source computer Application Groups selected to the target computer.

The present invention also provides a computer migration tool adapted for transferring software programs from a source computer to a target computer. The computer migration tool at least includes a source computer asset surveyor adapted to survey the source computer assets, a source computer application grouper adapted to, without scripts, associate portions of the source computer assets on the fly into source computer Application Groups, and a source computer list generator adapted to generate a list comprising the source computer Application Groups. The computer migration tool also at least includes a selection receiver adapted to receive a user's selection of source computer Application Groups to be migrated to the target computer, and an Application Group transferor adapted to transfer source computer Application Groups selected to the target computer.

BRIEF DESCRIPTION OF THE DRAWING FIGURES

Figure 1B:
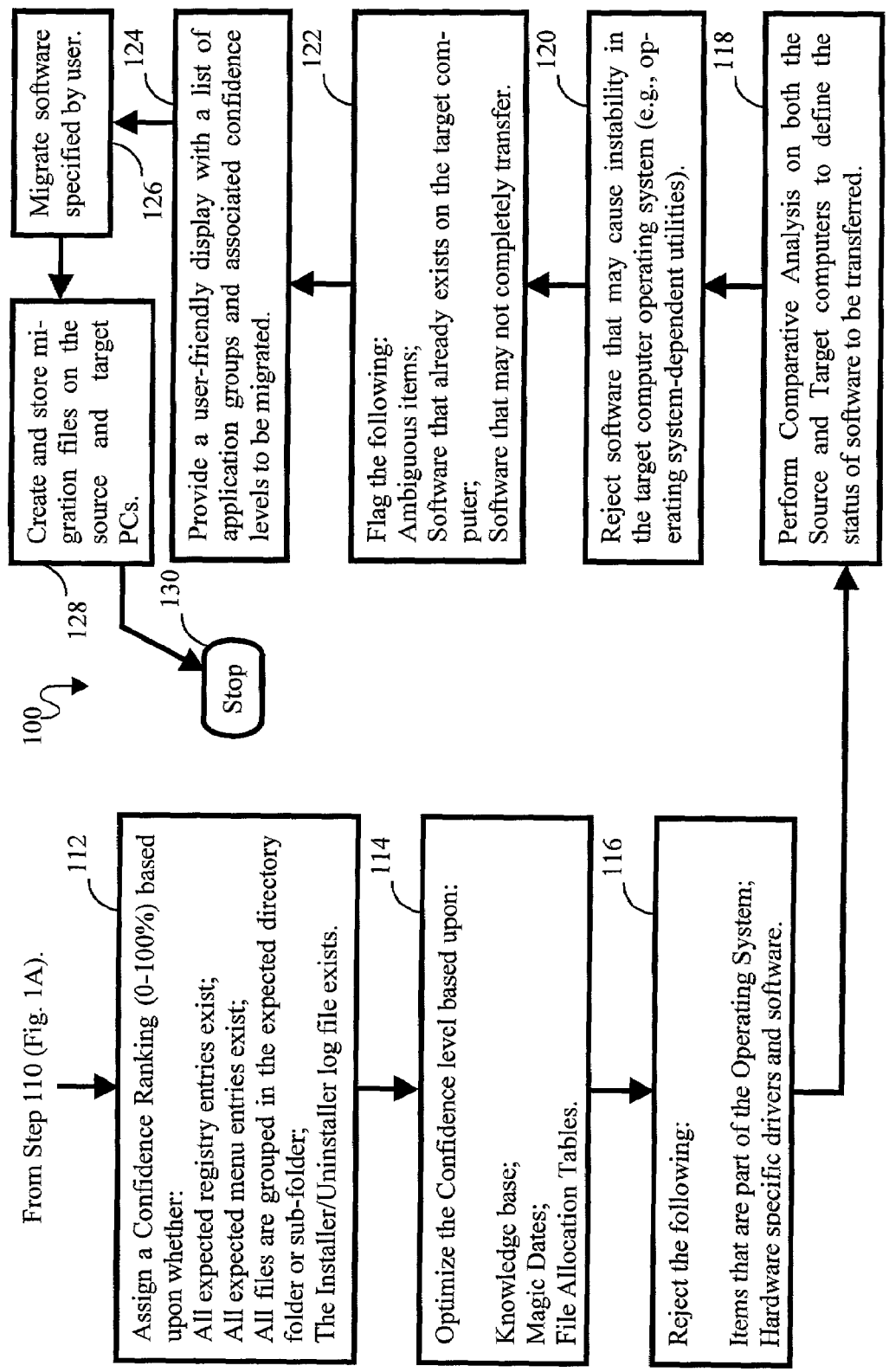
Figure 2:
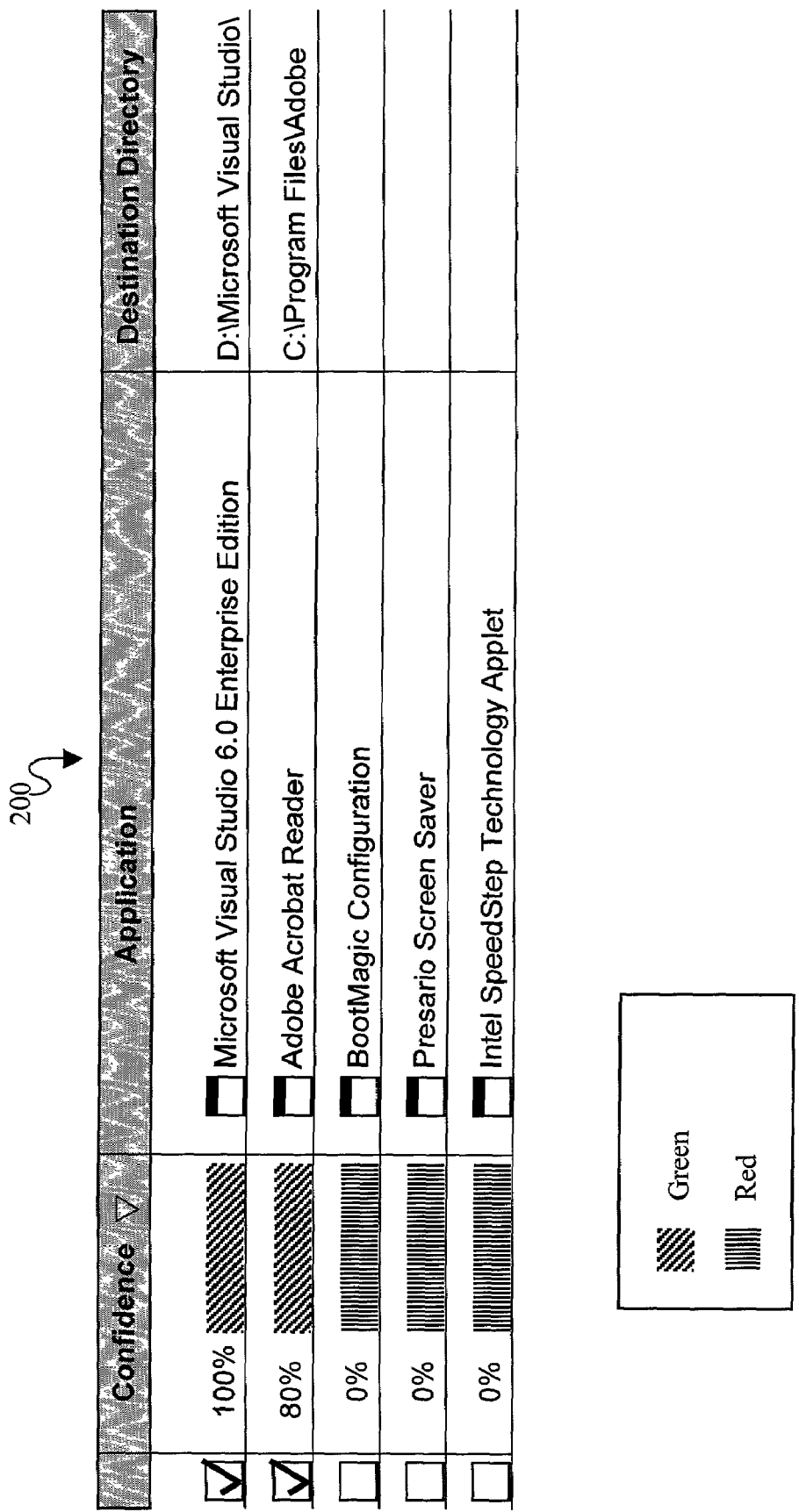

Features and advantages of the present invention will become apparent to those skilled in the art from the description below, with reference to the following drawing figures, in which:

FIGS. 1A and 1B together, constitute a flowchart detailing the steps of the present-inventive migration method; and FIG. 2 is an illustration of an interactive screen presented to the user of the present-inventive migration tool, showing the Application Groups being considered for migration, and the Confidence Levels (described infra) associated with each.

BRIEF DESCRIPTION OF THE APPENDICES

Appendix A includes the first 10 pages of an example of an installation log file for an installed program, which log file can be interpreted by the present-inventive migration tool; and Appendix B includes an example of an uninstall log file for an installed program, which log file can be interpreted by the present-inventive migration tool.

DESCRIPTION OF THE PREFERRED EMBODIMENTS

The term "program" is used broadly in the specification and claims of this Letters Patent to include not only algorithms that make up software, but data associated with software. The algorithms may be associated with applications, operating systems, and other functions and aspects of computer systems.

FIGS. 1A and 1B, together, illustrate the basic algorithm 100 capable of being practiced by one skilled in the art to implement the present-inventive computer migration tool.

To summarize, the present-inventive migration tool groups, "on the fly," all assets on a source computer into programs to be transferred to a target computer, and rather than relying upon scripts, relies upon predefined rules to decide the program association of assets encountered on the source computer.

The major steps in the present-inventive migration process are: 1) Scan the source computer to determine all of its assets; 2) Analyze the assets using predefined rules, and place them into Application Groups; 3) Perform a confidence analysis on each Application Group to designate a Confidence Level reflecting the likelihood that all of the actual components that are supposed to be included in an Application Group have in fact been so included; 4) Scan and analyze the target computer assets; 5) Present the migration tool user with a list of source computer Application Groups, along with their Confidence Levels established in Step 3, including a list of items not recommended for migration; 6) Transferring the items designated by the user from the source computer to the target computer; and 7) Creating and storing on both the source computer and the target computers, a log detailing the migration process undertaken.

Returning to FIG. 1A, the migration algorithm is begun at Step 102 by keystrokes or the manipulation of a pointing device. The first step (104) of the migration process is to ascertain all of the programs and assets of the source computer. Many different aspects of the source computer are scanned to accomplish this step. The following areas are scanned to find the programs and other items: Start Menus and related shortcuts; System Databases/Registries; Install and Uninstall log files; and the File System, including a full directory scan and a scan of likely application directories. The full directory scan includes known application directories, such as the "Program Files" directory. Examples of the application directory paths in Windows® based systems include "C:\<app directory>\," where <app directory> contains executables/application files and is not a known Windows® directory.

Installation log files are stored on computers when certain well-known installation technologies are used. Installation log files contain a listing of all of the files installed that make up a particular program. An example of a portion of such an installation log file is found in Appendix A.

Supplemental to perusing installation files, the migration tool can also check for and review uninstall log files. Uninstall log files may also contain useful information about the files which make up a particular program. An example of such an uninstall log file is found in Appendix B.

Step 106 of the migration process groups applications by: Directory, Installer Entry, Common Start Menu Folders, Application Name, Magic Dates (such as the creation or modification dates of files), and File Allocation Tables. Next, the migration process packages the applications into Application Suites, Files and Directories, Registry Entries, Start Menu/Desktop Shortcut Entries, and Installer Entries (Step 108).

In carrying out Steps 106 and 108 the migration tool initiates a rules-based approach to determine with which program, each file belongs. The predefined rules are based on empirical observations and the probabilities that files stored, created, or modified in certain ways are associated with the same program. While they are a matter of design choice, the rules for interpreting the program association of files are easily established and implemented by those skilled in the art.

For example, the migration tool assumes that files found in the same folder are part of the same program. Empirical observations by the inventors of the present invention strongly support this assumption.

As another example, the migration tool can be implemented to assume (with a high degree of confidence) that files created contemporaneously are part of the same program. The migration tool can also assume (with a high degree of confidence) that files modified contemporaneously are part of the same program.

Another rules-based approach is implemented as follows: by examining file allocation tables, the migration tool can assume (again, with a high degree of confidence) that files stored in locations which are nearby are part of the same program. The relative "closeness" of the files is a matter of design choice.

The next step (110) performs a Confidence Analysis on the Application Groups to generate a Confidence Level measuring the relative confidence that all of the assets which belong to an Application Group (and none which do not properly belong) have in fact been included in the Application Group. In the preferred embodiment, the Confidence Level is an assigned ranking from zero (0) percent to one hundred (100) percent (Step 112). More particularly, the confidence ranking is based upon such factors as whether all of the expected registry entries exist, whether all expected menu entries exist, whether all files are grouped in the expected directory folder or sub-folder, and whether installation or uninstallation log files exist.

The Confidence Level assigned in Step 112 is optimized in Step 114. Optimization involves comparing the information about the Application Groups to the knowledge base of the migration tool. Optimization also involves checking the "magic dates" of the files making up the Application Groups. Magic dates include such dates as the installation, creation, modification and uninstallation dates of files. The file allocation tables are also used to optimize the Confidence Level.

In the preferred embodiment, neither hardware specific drivers and software, nor items that are part of the operating system are transferred to the target computer unless the user specifically requests such a transfer. It has been found by the inventors that such files often cause noteworthy problems when transferred to target computers that are not identical to the source computers. Therefore, such items are rejected for migration in Step 116.

In Step 118, the target computer is scanned and analyzed in the same manner as was the source computer in Steps 104-108, so that the migration tool is aware of the Application Groups and items on both the source and target computers. This is followed by Step 120, which rejects software that may cause instability in the target computer operating system (e.g., operating system utilities).

While certain items will be rejected by the migration tool in Steps 116 and 120, there are other items which should be brought to the attention of the migration tool user as being suspect for migration. These are flagged in Step 122, and include: any ambiguous items; software that already exists on the target computer; and software that may not completely transfer from the source computer to the target computer.

Step 124 provides a user-friendly display with a list of Application Groups and other items on the source computer and their associated Confidence Levels, as well as destination locations on the target computer. Using the information from the display and a pointing device, the migration tool user can then make an informed decision about the items he or she wishes to migrate from the source computer to the target computer.

FIG. 2 illustrates an example of a display 200 presented in Step 124. In this example, the applications and items to be considered for migration are in the middle of the display. A Confidence section appears on the left, and includes transfer recommendation boxes, the Confidence Level of the Application Group or item, and a confidence bar reflecting the transfer recommendation. The target computer destination directory is listed on the right side of the display.

In the preferred embodiment, the confidence bars indicate by color, the Confidence Level. Much like a traffic signal, a green bar indicates that the item can be migrated without causing any problems in the target computer, a red bar indicates that the item should not be migrated, and a yellow bar urges caution in migrating the item (i.e., it is unclear whether migration of the item will cause problems in the target computer). Other approaches can be used instead of, or complimentary to, the color scheme of the confidence bars. For example, a full-length bar can indicate a 100 percent Confidence Level, while the shortest possible bar (or none at all in the alternative) can indicate a 0 percent Confidence Level.

When all of the programs and files are chosen for migration, and in response to the user's command, the migration tool transfers all of the designated programs and files from the source computer to the target computer (Step 126).

The last step (128) before the end (Step 130) of the migration algorithm creates and stores a migration log file detailing the completed migration process. In the preferred embodiment, duplicate migration log files are stored on both the source computer and target computer.

Variations and modifications of the present invention are possible, given the above description. However, all variations and modifications which are obvious to those skilled in the art to which the present invention pertains are considered to be within the scope of the protection granted by this Letters Patent.

For example, the present invention can be combined with a script-based approach for well-known software programs to be migrated, while relying upon the novel features described supra, for software programs that are not well-known, or are proprietary in nature.

It should also be understood that the novel teachings of the present invention can be utilized regardless of the size or complexity of the source and target computers (i.e., PC-to-PC migrations, mainframe-to-mainframe migrations, combinations or gradations of these, as well as migrations where one or more special purpose digital device is involved are all applicable).

What is claimed is:

1. A computer migration method for transferring non-physical aspects of a source computer to a target computer, said method comprising:
   a) surveying the source computer non-physical aspects;
   b) without using application specific scripts, grouping surveyed source computer non-physical aspects into at least a plurality of source computer Application Groups on the fly;
   c) assigning a confidence level to each Application Group, said confidence level representing a measure of confidence that all of the components comprising a complete Application Group have in fact been grouped with said Application Group and that components not belonging to said Application Group have not been grouped with said Application Group;
   d) generating a list comprising said source computer Application Groups and assigned confidence levels;
   e) receiving a user's selection of source computer Application Groups to be migrated to said target computer; and
   f) transferring selected source computer Application Groups to said target computer;
   wherein element b) is carried out via general, non-application specific predefined rules for determining which Application Group each non-physical aspect shall be grouped.

2. The method of claim 1, further comprising:
   generating a list of non-physical aspects that are not recommended for migration to said target computer.

3. The method of claim 1, further comprising:
   g) surveying the target computer non-physical aspects;
   h) without using application specific scripts, grouping surveyed target computer non-physical aspects into at least a plurality of target computer Application Groups on the fly;
   i) following element h), generating a list comprising said target computer Application Groups; and
   j) comparing said source computer Application Groups with said target computer Application Groups, and said source computer Application Groups with other attributes of said target computer to determine whether each source computer Application Group should be migrated.

4. The method of claim 3, wherein element e) is carried out via generating at least one interactive display having said source computer Application Groups.

5. The method of claim 1, wherein element e) is carried out via generating at least one interactive display having said source computer Application Groups.

6. The method of claim 1, wherein element b) comprises:
   extracting information from at least one installation log file; and
   interpreting extracted information to ascertain files belonging to an Application Group.

7. The method of claim 1, wherein element b) further comprises:
   examining file folders; and
   assuming files in the same file folders are part of the same Application Group.

8. The method of claim 1, wherein element b) further comprises:
   examining file allocation tables; and
   declaring that files located within a predefined proximity have a greater likelihood of being part of the Application Group.

9. The method of claim 1, wherein element b) further comprises:
   examining file creation information; and
   declaring that files contemporaneously created have a greater likelihood of being part of the same Application Group.

10. The method of claim 1, wherein element b) further comprises:
    examining file modification information; and
    declaring that files contemporaneously modified have a greater likelihood of being part of the same Application Group.

11. The method of claim 1, further comprising:
    g) storing a migration summary on the source computer and on the target computer.

12. A computer migration tool adapted for transferring non-physical aspects of a source computer to a target computer, wherein one or more components of the computer migration tool are stored on at least one of the source computer and the target computer, said computer migration tool comprising:
    a source computer asset surveyor adapted to survey the source computer non-physical aspects;
    a source computer application grouper adapted to, without using application specific scripts, group surveyed source computer non-physical aspects on the fly into at least a plurality of source computer Application Groups;
    a confidence level designator adapted to assign a confidence level to each Application Group, said confidence level representing a measure of confidence that all of the components comprising a complete Application Group have in fact been grouped with said Application Group and that components not belonging to said Application Group have not been grouped with said Application Group;
    a source computer list generator adapted to generate a list comprising said source computer Application Groups and assigned confidence levels;
    a selection receiver adapted to receive a user's selection of source computer Application Groups to be migrated to said target computer; and
    an Application Group transferor adapted to transfer source computer Application Groups selected to said target computer;
    wherein said application grouper is adapted to group non-physical aspects via general, non-application specific predefined rules for determining which Application Group each non-physical aspect shall be grouped.

13. The computer migration tool of claim 12, further comprising:
    a list generator adapted to generate a list of non-physical aspects that are not recommended for migration to said target computer.

14. The computer migration tool of claim 12, further comprising:
    a target computer asset surveyor adapted to survey the source computer non-physical aspects;
    a target computer application grouper adapted to, without using application specific scripts, group surveyed source computer non-physical aspects on the fly into at least a plurality of source computer Application Groups;
    a target computer list generator adapted to generate a list comprising said source computer Application Groups; and
    a comparator adapted to compare said source computer Application Groups with said target computer Application Groups, and said source computer Application Groups with other attributes of said target computer to determine whether each source computer Application Group should be migrated.

* * * * *